Sept. 4, 1928.
A. THOMAS
SHOCK ABSORBER
Filed Oct. 3, 1927
1,683,499
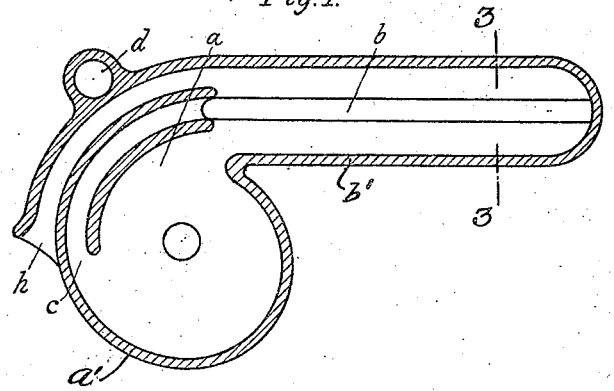
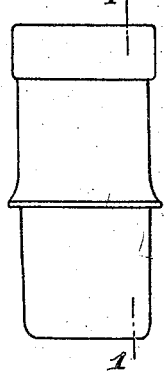
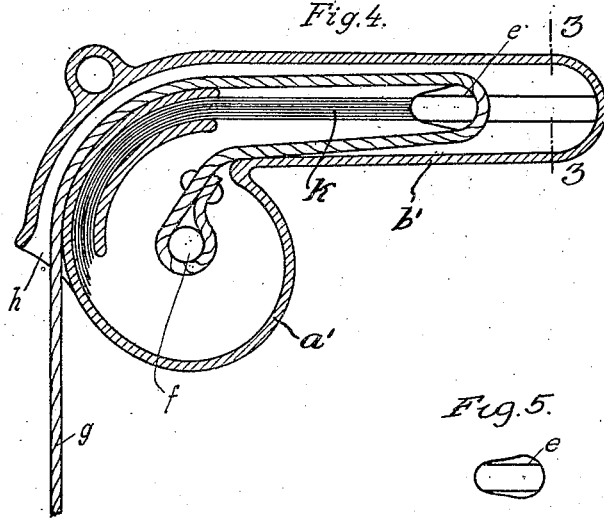
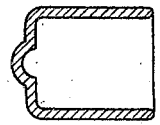
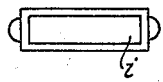
A. Thomas
INVENTOR
By: Marks & Clerk
Attys.

Patented Sept. 4, 1928.

1,683,499

UNITED STATES PATENT OFFICE.

AUGUST THOMAS, OF BERLIN-BAUMSCHULENWEG, GERMANY, ASSIGNOR OF ONE-HALF TO CARL von HARYES, OF BERLIN, GERMANY.

SHOCK ABSORBER.

Application filed October 3, 1927, Serial No. 223,752, and in Germany July 2, 1926.

This invention relates to shock absorbers, more particularly for use with power driven vehicles, and has for its object to provide a shock absorber which damps the oscillations of the sprung vehicle body caused by shocks, by a leaf spring being inserted into a round casing fixed to the vehicle body through a pull strap which is connected to the leaf spring and is fixed to the wheel axle, the said leaf spring performing a braking action which diminishes the oscillations and therefore damps the vehicle body.

The present invention provides a new constructional form of such a shock absorber, which takes up little space, acts in a particularly efficient manner, owing to the pull strap having a long working path, and is so constructed that the pull of the pull strap is taken up in such a manner that there can be no tilting moment detrimentally affecting fixing of the shock absorber.

The accompanying drawing shows a constructional example of the shock absorber according to the invention:

Figure 1 being a longitudinal section through the casing of the shock absorber on line 1—1 of Fig. 2, Figure 2 a front view of Fig. 1, Figure 3 a section on line 3—3 on Fig. 1, and 3—3 Fig. 4 respectively, Figure 4 a longitudinal section through the shock absorber with all the parts belonging thereto, and Figures 5 and 6 a detail of Figure 4.

The casing $a$ of the shock absorber is composed of a round part $a'$ and a tangential extension $b'$ of the same (see Figs. 1 and 4). In each of the vertical side walls of the extension is a semicircular guiding groove $b$ (Fig. 3 shows only one half of the extension of the casing), a curved guide $c$ being provided in the interior of the round part $a'$ of the casing. On the outside of this part of the casing a suspending eye $d$ is provided and a slot-shaped opening $h$ for the insertion of the pull strap $g$.

In the guiding groove or grooves $b$ of the casing a sliding member $e$ is adapted to slide, which, as shown in Figure 5, is made in the form of a frame, having an opening $i$, in one end in which a spring $k$ is socketed, which is preferably composed of a plurality of leaf springs gradually increasing in length. The pull strap $g$ which is inserted through the slot $h$ passes around the sliding member $e$ which, for diminishing the friction, is rounded at the rear side, and is fixed in the round part of the casing to a pin $f$. The pull strap $g$ rests on the convex side of the curved guide $c$, the ends of the leaf spring extending into the said guide. The other end of the pull strap $g$ (not shown in the drawing) is fixed to the wheel axle of the vehicle.

On the pull strap being put in tension through a jolt and the consequent oscillation of the vehicle body, it will displace the sliding member $e$ in the guide $b$, causing the leaf spring to enter further into the guide $c$ and therefore into the round part of the casing, so that the spring will have a braking action which will have a damping effect on the oscillations of the vehicle body. As will be seen, the relative arrangement of the pull strap and the damping spring is such that the pull strap will have to travel twice as far as the sliding member $e$ and the spring, which is an important feature for the functioning of the shock absorber.

The pressure exerted on the casing, when the pull strap $g$ is tensioned is taken up by guide $c$ lying below the suspending eye $d$, so that, the eye being arranged in this manner, the pressure of the pull strap cannot produce a tilting moment tending to swing the casing $a$ of the shock absorber. Thus the shock absorber is always in working order, even if the fixing bolt (not shown) which passes through the eye $d$ should become somewhat loosened.

What I claim is:

1. A shock absorber for road vehicles comprising the combination with a wheel axle of a casing constituted by a round part and a tangential extension to the said round part, a sliding member capable of sliding in the said extension, a guide for the said sliding member, a leaf spring attached to the said sliding member and a pull strap having one of its ends fixed to the wheel axle of the vehicle, the pull strap passing in the casing around the said sliding member, whereby, on the vehicle being subjected to jolts, the spring is pushed into the round part of the casing, as set forth.

2. A shock absorber as claimed in claim 1, and having a suspending eye on the outside of the casing substantially vertically above the part of the casing subjected to the pressure due to the pull of the pull strap on the vehicle being jolted, as set forth.

In testimony whereof I have signed my name to this specification.

AUGUST THOMAS.